3,736,304
PRODUCTION OF POLYMERS COMPRISING ACRYLONITRILE AND A TERTIARY AMINO ALKYL ESTER OF AN UNSATURATED ACID
James C. Masson, Chapel Hill, and Lester A. Self, Roxboro, N.C., assignors to Monsanto Company, St. Louis, Mo.
No Drawing. Filed Aug. 27, 1971, Ser. No. 175,712
Int. Cl. C08f 15/22
U.S. Cl. 260—85.5 R          8 Claims

ABSTRACT OF THE DISCLOSURE

By using a varied monomer feed rate to a polymerization reactor and acidifying the reaction mass with a monobasic acid a markedly improved process for obtaining excellent conversion and high yields of polymers is achieved, the polymers comprising acrylonitrile and a tertiary amino alkyl ester having the general formula:

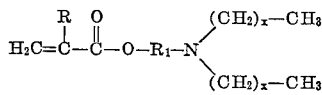

wherein R is hydrogen or methyl, $R_1$, is an alkylene of two to four carbon atoms, $-CH_2-CH(OH)-CH_2-$, or $-CH_2-CH_2-O-CH_2-CH_2-$, and $x$ is an integer zero to three, inclusive.

BACKGROUND OF THE INVENTION

(a) Field of the invention

The present invention is concerned with a chemical process for the production of particular acrylic polymers. More particularly, this invention relates to new and useful improvements in a method for producing polymer of acrylonitrile and vinyl-containing esters having a tertiary amine useful in fiber-forming compositions.

(b) Description of the prior art

A significant amount of polymerization reactions are carried out with the aim to incorporate within a polymer a certain functional group to achieve special or unusual properties such as dyeability, antistatic, and flame resistance. The rate of polymerization, amount of conversion and yield obtained are important factors to be considered. Also, the ease of isolation of a particular polymer is an essential consideration and may make the difference between an economic process and one which is not. These factors are often dependent upon reaction variables such as monomer proportions, reaction temperature, solvent, initiators, counterions, and comonomers present.

Acrylonitrile polymers, particularly fiber-forming compositions, may have comonomers included to bring out a number of characteristics, such as dye receptive properties, to render them of substantial value for a variety of textile and other purposes. Admittedly, the resistance of acrylonitrile polymers to various dyestuffs has presented serious dyeing problems which have been overcome to a large extent by appropriate polymer and fiber modification. Each class of dye receptive groups has had certain limitations connected therewith. Although improved acidic dyeable compositions have been accomplished through the incorporation of dye receptive monomers containing nitrogen such as vinylpyridines or substituted vinylpyridines, the employment of such monomers generally require low dyeing pH and the resultant fibers have poor lightfastness and poor heat stability.

Tertiary amines, being stronger bases than pyridines, are a more effective means of imparting acid dyeability. Acid dyeable fibers based on tertiary amines have better dyed lightfastness. It is possible to incorporate small amounts of an acrylate ester of a tertiary amine in a typical acrylic composition to achieve an acid dyeable fiber. Some disadvantages attend this procedure. If the polymer also contains a halogen group (to give flame-retardancy), a cross-linking reaction between the amine and halogen can occur in storage of the spinning dope. A better commercial practice is to prepare an acrylonitrile-tertiary amine acrylate ester copolymer containing a high proportion of the tertiary amine and to blend dopes of the desired base polymer with the acrylonitrile-tertiary amine copolymer immediately prior to spinning. This gives a fiber of excellent acid dyeability which is readily spinnable.

SUMMARY OF THE INVENTION

The primary purpose of this invention is to provide a method of forming polymers comprising acrylonitrile and an acrylate or methacrylate ester having a tertiary nitrogen.

Another purpose of this invention is provide a method of forming polymers of acrylonitrile and an acrylate or methacrylate ester having a tertiary nitrogen wherein a high percentage of conversion from monomer to polymer is obtained.

Still another object is to provide a method of readily isolating and recovering copolymers of acrylonitrile and an acrylate or methacrylate ester having a tertiary nitrogen from aqueous polymerization systems.

It is an additional object of this invention to provide acrylonitrile compositions having acid dyeability and good lightfastness without loss or deterioration of other desirable properties.

In general, the objects of the subject invention are accomplished by a significant modification of conventional polymerization methods employed in the art. In particular, this modification relates to starting polymerization within a polymerization system having major proportion by weight of acrylonitrile and a minor amount of an acrylate or methacrylate ester having a tertiary amine in the alcohol moiety whereby the minor amount is about 5 parts by weight for an initial time period, while maintaining a pH between about 2.5 and 6.5 and thereafter increasing the amount of said ester to about 25 parts by weight during the concluding time period of polymerization, the pH being within the same pH range as aforementioned, and thereafter precipitating the resulting polymer by adding a coagulating agent.

In the practice of this invention, the early portion of the polymerization appears to be a suspension process. However, as the proportion of polymer containing a high ratio of the acrylate or methacrylate ester having a tertiary nitrogen increases, the reaction assumes an emulsion character.

Generally, polymerizations in aqueous media in accordance with this invention are initiated by means of water-soluble redox initiators or azo initiators commonly employed for polymerizing ethylenically unsaturated groupings. Among such redox initiators are potassium persulfate-sulfur dioxide, sodium chlorate-sulfur dioxide, sodium persulfate-sodium bisulfite. Also, azo-initiators, such as azo - 2,2' - diisobutyronitrile, may be readily employed. It is understood that a relative variation in the quantity of initiators is possible. For example, from 0.05 to 5.0 percent based on weight of the polymerizable monomer may be advantageously used in the polymerization process. The amount employed will be influenced by the molecular weight of the polymer desired. In the case of the redox initiators, the ratio of oxidant to reductant may also be varied. Since the acrylate or methacrylate esters of tertiary amines have the property of reducing molecular weight by causing chain transfer, a minimum proportion of sulfur dioxide or its salts is advantageous. When an azo initiator is employed, a chain transfer agent may be required to reduce polymer molecular weight. Suitable compounds include β-mercaptoethanol, α-thioglycerol, t-dodecyl mercaptan and the like. The azo initiator may be charged at the outset of the reaction, or it may be added continuously, or in increments, throughout the reaction for the purpose of maintaining a more uniform concentration of initiator in the reaction mass. The continuous method of addition is preferred because it tends to make the resultant polymer more uniform in its chemical and physical properties. Redox initiators must be added throughout the reaction because the life-time of the active species is relatively short.

In general, the polymerization is carried out in water in which the polymerizable components are relatively soluble and the polymer is insoluble. Further, the polymerization may be effected, if desired, while the aqueous medium is under an atmosphere of an inert gas, as nitrogen, or carbon dioxide. A semi-batch procedure may be employed wherein the polymerization vessel is charged with water and an acid.

It is necessary for the purpose of this invention that a monobasic acid be used having an ionization constant greater than $1.0 \times 10^{-3}$ at 25° C., in an aqueous medium. Suitable acids include nitric acid, hydrochloric acid, hydrobromic acid, monochloracetic acid, dichloracetic and trichloracetic acid. The amount of acid employed is about equivalent to the tertiary amine introduced. Generally, the pH of the polymerization during the course of the reaction is critical and should be kept between about 2.5 and about 6.5. When initiators such as $K_2S_2O_8$ and $SO_2$ or $NaClO_3$ and $SO_2$ are employed the preferred pH is between about 2.5 to about 3.5. The rate of acid addition is varied in proportion to the dye receptive monomer content to maintain a constant pH.

The temperature at which polymerization may be carried out can be varied over a wide range depending on the initiator system employed, up to and including the boiling point of the polymerizable components. In most instances, the temperature of polymerization will be within the range of about 30° C. to 70° C.

The polymerizations are generally and preferably carried out in glass or glass-lined vessels which are provided with means for agitating the contents thereof. Generally, rotary stirring devices are the most effective means of insuring the intimate contact of the reagents, but other means may be successfully employed. The polymerization equipment generally used is conventional in the art and any adaptation of a particular type of apparatus to the reaction contemplated is within the province of one skilled in the art.

When the polymerization is complete the polymer is isolated from the aqueous medium by neutralization with base such as NaOH or KOH to convert the tertiary amine salts to free amine and thus coagulate the emulsion or by treatment with a thiocyanate salt such as NaSCN or $NH_4SCN$ to coagulate the polymer with the amine groups mainly present as thiocyanate salts. The amount of the base or thiocyanate salt employed should approximately be equivalent to the amine content of the monomer fed. The polymer may then be readily separated from the aqueous phase by simple filtration or centrifugation. The resulting polymer in either case may require washing operations to remove traces of initiator and other salts.

The polymerizations are preferably initiated by changing an aqueous medium and heating to approximately the temperature of polymerization, for example, between 30° and 70° C., with an inert gas purge. Monomer, initiator, and acid are introduced in feed streams throughout the polymerization. If the acrylate or methacrylate ester having a tertiary nitrogen is introduced as an aqueous feed, it is desirable to add the acid to this feed to minimize hydrolysis of the ester. During the initial 15 to 30 minutes of polymerization the proportion of acrylonitrile to tertiary amine fed is about 95 to 5. For the concluding 105–90 minutes of the polymerization period, a 2 hour proportion of tertiary amine is increased to about 22–32 parts, to give an overall proportion of 20–25 parts. Thus, the amount of tertiary amine is low during the first 12–25% of the polymerization reaction and is higher during the remainder of the reaction period. After all the monomers have been added it is desirable to continue heating and agitation for a short period of time to assure a substantially complete polymerization. The reaction mixture may be steam-distilled to remove unreacted acrylonitrile and the polymer then separated from the aqueous medium.

The polymers may be readily precipitated from the reaction mixture by addition of a coagulating agent in accordance with this invention. The polymer may be precipitated with a base until the pH is at least 8 or above before filtration. Alternately, the polymer may be precipitated by addition of a compound producing thiocyanate ion in an amount at least equivalent to the amine content of the polymer. Thiocyanic acid and the alkali and ammonium salts of thiocyanic acid may be advantageously employed. The polymers thus precipitated can be thereafter dissolved in various well-known solvents for acrylonitrile polymers.

The polymers from which the polymer compositions are produced in accordance with the present invention have specific viscosity value, as employed herein, is represented by the formula:

$$N_{sp} = \frac{\text{Time of flow of polymer solution in seconds}}{\text{Time of flow of solvent in seconds}} - 1$$

Viscosity determinations of the polymer solutions and solvent are made by allowing said solutions to flow by gravity at 25° C., through a capillary viscosity tube. In the determination herein, a polymer solution containing 0.1 gram of polymer dissolved in 100 ml. of N,N'-dimethylformamide containing 0.2% LiCl was employed.

The amount of tertiary amine incorporated in the polymer may be determined by several means, for example, infrared analysis, titration, or dyeing tests. In the examples described herein, a dyeing test has been employed for assay of the amine content of the polymer. The polymer is ground to pass 20 mesh. It is dyed at 100° C., for 2 hours in a 5.0 gram/liter Scarlet Red 1B (Color Index 16255) solution buffered to pH 2.5 using a 160:1 liquor ratio. The polymer is washed free of adsorbed dye and the residual dye in solution is determined spectrophotometrically. Based on the practical equivalent weight of the dye (taking into account molecular weight, purity, and number of active sulfonate groups), the incorporation of amine in the polymer may be determined.

Suitable N,N-dialkylaminoalkyl acrylates and methacrylates include:

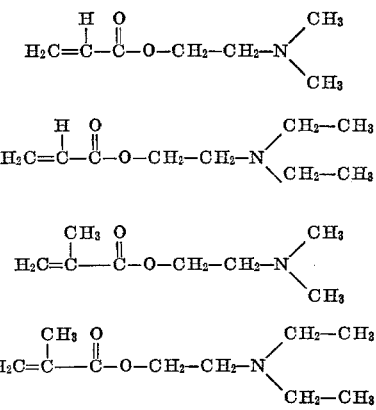

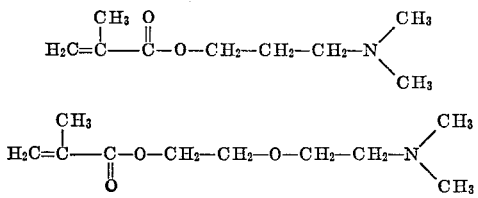

The polymer herein may be a copolymer of from about 70 to about 90 percent acrylonitrile and from about 10 to about 30 percent by weight of the acrylate or methacrylate ester having a tertiary amine. The polymer may also be an interpolymer containing one or more other monomers having a vinyl linkage and polymerizable with acrylonitrile, said monomers being from about 1 to about 10 percent by weight. Suitable monoolefinic monomers include the methacrylates such as methyl methacrylate, ethyl methacrylate, butyl methacrylate, octyl methacrylate, methoxymethyl methacrylate, and the corresponding esters of acrylic acid, methacrylonitrile; acrylamide and methacrylamide; methyl vinyl ketone; vinyl acetate, vinyl propionate; styrene; vinyl naphthalene; and other olefinic materials copolymerizable with acrylonitrile.

The dyes which can be satisfactorily applied in the practice of this invention include all those known as acidic dyes. They are well-recognized class of anionic dyes which are commercially available and contain mostly sulfonic acids, and sometimes carboxylic acids, and prepared in the form of sodium salts thereof.

The polymers made in accordance with this invention are useful for production of acid dyeable filamentary forms when blended with acrylonitrile copolymers containing more than 70 weight percent acrylonitrile.

In preparing filamentary forms from the polymers herein described any of the conventional equipment ordinarily employed in the manufacture of artificial and synthetic fibers and filaments may be used.

Any of the well-known prior art solvents, for example, dimethylacetamide, dimethylformamide, dimethyl sulfoxide, concentrated aqueous solutions of certain salts such as sodium thiocyanate, zinc chloride and the like may be used in the practice of this invention. Coagulation baths, consisting essentially of a solution of solvent and non-solvent, orientation and washing methods normally used in solution spinning are suitable for preparing the fibers of the invention.

The following examples are illustrative only and should not be construed as limiting the invention which is properly delineated in the appended claims. Unless otherwise indicated, "part" as used in examples express parts by weight.

EXAMPLE 1

A glass reactor provided with a stirring mechanism, feed reservoirs, and a reflux condenser was charged with 200 parts by weight of water; the reactor was purged with nitrogen while stirring and heated to about 50° C. A polymerization feed was added consisting of a monomer mix of 80 parts by weight acrylonitrile and 20 parts by weight N,N-dimethylaminoethyl methacrylate (MET), 9.2 parts nitric acid (100% basis), and initiator of 0.25 part $NaClO_3$, and 1.0 part $SO_2$ added as sodium bisulfite. The polymerization feed was added at a constant rate over a period of 2 hours, said reactants being mixed thoroughly and maintained at a temperature of about 50° C. The reaction mixture was then stirred for an additional one-half hour. The final pH was 1.8. The reaction mass was thereafter filtered directly and washed with water; it was observed that the polymer product was slow in filtration and did not coagulate. The specific viscosity was 0.13; there was 16 percent MET in the polymer. The amount of conversion was 44%.

EXAMPLE 2

A reactor as provided in Example 1 was set up and charged with 200 parts water. The reactor was thereafter purged with nitrogen while being stirred and heated to about 50° C. The polymerization reactor feed consisted of a monomer mix of about 80 parts acrylonitrile and 20 parts by weight MET, 6.8 parts sulfuric acid (100% basis), an initiator of 0.5 part $K_2S_2O_8$, and 1.0 part $SO_2$ added as sodium bisulfite. The reaction mass was stirred constantly and the feed added continuously over a two hour period and maintained at about 50° C. It was thereafter stirred for an additional one-half hour. The final pH was 2.2. After the reaction was completed $Na_2SO_4$ was added to coagulate the polymer and the polymer product was filtered and washed with water. It was observed that the polymer product was very slow in filtration. The specific viscosity could not be determined since the polymer was insoluble in dimethylformamide. The conversion was 43%. The MET incorporated in the polymer was determined to be 21%.

EXAMPLE 3

A reactor as provided in Example 1 was setup and charged with 200 parts water. The reactor was thereafter purged with nitrogen while being stirred and heated to about 50° C. The polymerization feed consisted of a monomer mix of 80 parts acrylonitrile (AN) and 20 parts by weight MET, 6.8 parts sulfuric acid, an initiator of 0.25 part $NaClO_3$, and an activator 1.7 parts $SO_2$ added as sodium bisulfite. The reaction mass was mixed constantly over a 2 hour period and maintained at about 50° C. The feed mix was added to exhaustion at a variable rate over the 2 hour period and thereafter stirred for an additional one-half hour. The polymerization was started by using a feed with about 5 parts MET and 95 parts AN for the first 20 minutes. For the next 80 minutes the feed consisted of 29 parts MET and 71 parts AN. The feed for the final 20 minutes was 5 parts MET and 95 parts AN. The rate of the acid feed was varied also to maintain constant pH; the final pH was 2.0. After the reaction was completed the polymer mass was neutralized with NaOH to pH 10 then filtered and washed thoroughly. The polymer product showed a slow filtration. The specific viscosity was 0.10. The percent conversion was 65%. The percent MET incorporated in the polymer was 21%. This example illustrated that use of a variable monomer feed improves conversion as compared to the constant rate feeds and conditions set forth in Examples 1 and 2.

EXAMPLE 4

A reactor as provided in Example 1 was setup and charged with 200 parts water, and thereafter purged with nitrogen and heat to about 50° C. The polymer reactor feed consisted of a monomer mix as in Example 1 with the exception that an initator of 0.5 part $K_2S_2O_8$ and 1.0 part $SO_2$ as $NaHSO_3$ was employed and the mass was acidified by 6.8 parts $H_2SO_4$. The polymerization feed was added at a variable rate over a period of about 2 hours as described in Example 3 and thereafter stirred for an additional one-half hour. The final pH was 3.0 for the reaction medium. The reaction mass was thereafter neutralized by addition of NaOH solution then filtered and washed with water. Filtration was still slow. The amount of MET was determined to be 20%. The conversion was 75% and the specific viscosity of the polymer was 0.05. This example again illustrates the improved conversion attainable through use of the variable monomer feed.

EXAMPLE 5

A reactor as provided in Example 1 was setup and charged with 200 parts water, and thereafter purged with nitrogen while being stirred and heated to about 70° C. The overall ratio of reactants feed was: water 300 parts, AN 80 parts, MET 20 parts, sulfuric acid 6.4 parts, and azo 2,2'-diisobutyronitrile (AIBN) 1 part. For the first and last 20 minutes a feed ratio of 5 parts MET, 95 parts AN was fed. In the middle 80 minutes, the ratio was 29 parts MET, 71 parts AN. The reaction was maintained at about 70° C., for the two hours of the reaction and for a 30 minute "finishing" period. The polymer slurry became so viscous, stirring was very difficult. The final pH was 3.0. The polymer was isolated by neutralization with NaOH followed by filtration and washing. Filtration was slow. The conversion was 85%. The specific viscosity of the polymer was 0.30. The amount of MET in the polymer was determined to be 18%. This runs shows that the variable monomer feed gives high conversions using azo as well as redox initiator systems.

EXAMPLE 6

A reactor as provided in Example 5 was setup with the same feed compositions and rates with the exception that 7.4 parts nitric acid was employed in place of $H_2SO_4$ to acidify the polymerization mass. The slurry remained thin throughout the run. The final pH was 3.0. After NaOH neutralization the filtration was observed to be fast. The polymer, isolated in 78% conversion had a specific viscosity of 0.35 and contained 19% MET. It was observed that the substitution of nitric acid gave a thin slurry and fast filtration after neutralization with sodium hydroxide.

EXAMPLE 7

The experiment of Example 4 was repeated with the exception that nitric acid was employed instead of sulfuric. The temperature of polymerization was maintained at 50° C. The final pH was 2.9. The rate of filtration was fast for the coagulated polymer. The amount of conversion was 63% and the specific viscosity was 0.10. The amount of MET incorporated in the polymer was 22%.

EXAMPLE 8

A reactor as provided in Example 3 was setup and charged with 200 parts water. The minomer mix and feed schedule was identical to Example 3. The initiator was composed of 1.0 part $NaClO_3$ and 1.7 parts $SO_2$ as sodium bisulfite; nitric acid was used as the acidifying agent. The final pH was 2.0. The coagulated polymer was slow in filtration. The conversion of polymer was 75%. The specific viscosity of the polymer was 0.16 and the amount of MET in the polymer was 18%. It is observed that there is generally a thinner slurry, a more readily filtered product, a higher conversion, and an increase in polymer specific viscosity through the use of nitric acid, a monobasic acid in place of sulfuric acid.

EXAMPLE 9

A reactor as provided in Example 1 was setup and charged with 200 parts water. The reactor was thereafter purged with nitrogen while being stirred and heated to about 50° C. The polymerization reactor feed consisted of 300 parts water, 75 parts acrylonitrile, 25 parts MET, 7.8 parts $HNO_3$, and 2.0 parts AIBN. The monomer feed was adjusted so that in the initial 20 minutes and final 20 minutes of polymerization the MET was 5 parts by weight. In the middle 80 minutes the MET content of the feed was 36.5 parts. The temperature was maintained during the polymerization at 70° C. The final pH was 4.9. The polymer was isolated by neutralization with NaOH and filtration; it filtered fast. The amount of conversion to polymer was 79%. The specific viscosity was 0.21 and amount of MET incorporated in the polymer was 29%.

EXAMPLE 10

A reactor as provided in Example 1 was setup and charged with 200 parts water. The reactor was thereafter purged with nitrogen while being stirred and heated to about 70° C. The polymerization reactor feed consisted of a monomer mix of 80 parts acrylonitrile and 20 parts MET, one part AIBN and 0.5 part α-thioglycerol as a chain transfer agent. The reaction mixture was acidified with $HNO_3$. The feed mix was added at a variable rate as in Example 9 over the 2 hour period and thereafter stirred for an additional one-half hour. The temperature was maintained at 70° C., throughout the run. The final pH was 6.6. After NaOH coagulation the polymer product was relatively fast in filtration. A polymer containing 20% MET with a specific viscosity of 0.19 was isolated in 74% conversion.

EXAMPLE 11

A reactor as provided in Example 1 was setup and charged with 200 parts water. The reactor was thereafter purged with nitrogen while being stirred and heated to about 50° C. The polymerization reactor feed consisted of 80 parts AN, 20 parts MET, 4.3 parts HCl, 1 part NaCl, 0.5 part $K_2S_2O_8$, and 1.0 part $SO_2$ as $NaHSO_3$. The feed mix was added at a variable rate as in Example 9 over a 2 hour period and thereafter stirred for an additional one-half hour. The final pH was 3.8. The polymer was isolated by NaOH neutralization followed by filtration and washing. The filtration rate was medium. The amount of conversion was 83%. The specific viscosity of the polymer was 0.07. The amount of MET incorporated in the polymer was 19%. This example shows another strong monobasic acid may be substituted for nitric acid in the formulation without detriment to the conversion.

EXAMPLE 12

A reactor as provided in Example 1 was setup and charged with 260 parts water. The reactor was thereafter purged with nitrogen while being stirred and heated to about 50° C. The reactor feed consisted of 80 parts AN, 20 parts MET, 7.4 parts $HNO_3$, 0.5 parts $K_2S_2O_8$, 0.5 part $SO_2$ as $NaHSO_3$, and 1 part $NaNO_3$. The polymerization temperature was maintained at 50° C. The final pH was 2.8. The polymer was coagulated by addition of 29 parts NaSCN dissolved in $H_2O$. The product was filtered and washed thoroughly in water. It was observed that the polymer product was moderately filterable. A 72% conversion of a 0.13 specific viscosity polymer containing 20% MET was afforded.

We claim:

1. In a process for producing polymers comprising 70–90% by weight of acrylonitrile and 30–10% by weight of an ester represented by the formula:

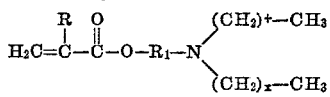

wherein R is hydrogen or methyl, $R_1$ is an alkylene of two to four carbon atoms, $-CH_2-CH(OH)-CH_2-$ or $-CH_2-CH_2-O-CH_2-CH_2-$, and $x$ is an integer zero to three, inclusive, in the presence of an initiator and water, the improvement which comprises commencing polymerization for an initial time period of 12–25% of the total polymerization period with about 5 parts by weight of said ester and 95 parts acrylonitrile at a pH between about 2.5 and about 6.5 by employing a monobasic acid having an ionization constant $>10^{-3}$, increasing the amount of said ester to about 25–35 parts during the remaining 88–75% of the period of polymerization while maintaining the pH between said values, and thereafter precipitating the resulting polymer by adding a coagulating agent.

2. A process as recited in claim 1 wherein the ester is a tertiary aminoalkyl acrylate.

3. A process as recited in claim 1 wherein the ester is a tertiary aminoalkyl methacrylate.

4. A process as recited in claim 1 wherein the ester is N,N-dimethylaminoethyl methacrylate.

5. A process as recited in claim 1 wherein the coagulating agent is an alkali hydroxide.

6. A process as recited in claim 1 wherein the coagulating agent is an alkali or ammonium thiocyanate.

7. The process as recited in claim 1 wherein the pH is maintained by a monobasic acid having an ionization constant between about 2.5 and 3.5.

8. In a process for producing polymers comprising 70–90% by weight of acrylonitrile and 30–10% by weight of an ester having the structural formula:

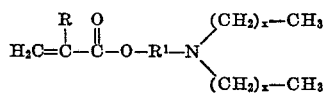

wherein R is hydrogen or methyl, $R_1$ is an alkylene of two to four carbon atoms, $-CH_2CH(OH)-CH_2-$, or $-CH_2-CH_2-O-CH_2-CH_2-$, and $x$ is an integer zero to three, inclusive, in the presence of a redox or azo initiator and water, the improvement which comprises commencing polymerization for an initial time period of from about 15 minutes to about 30 minutes with about 5 parts of said ester at a pH between about 2.5 and about 6.5 maintained by employing a monobasic acid with an ionization constant $>10^{-3}$, increasing thereafter the amount of ester to between 20 to about 35 parts during a concluding time period of polymerization of about 105 to about 90 minutes at a pH between said values, and thereafter precipitating the resulting polymer by adding a coagulating agent.

References Cited
UNITED STATES PATENTS 3,428,617  2/1969  SoBolev _____ 260—85.5 ES
3,493,552  1/1970  Rai et al. _____ 260—85.5 ES HARRY WONG, JR., Primary Examiner U.S. Cl. X.R.

260—29.6 AN, 30.8 DS, 32.6 N, 65, 80.73, 85.5 P